(12) United States Patent
Kim

(10) Patent No.: US 12,445,984 B2
(45) Date of Patent: Oct. 14, 2025

(54) COMMUNICATION SYSTEM, TRANSMITTER DEVICE, AND RECEIVER DEVICE

(71) Applicants: KABUSHIKI KAISHA TOSHIBA, Tokyo (JP); TOSHIBA ELECTRONIC DEVICES & STORAGE CORPORATION, Tokyo (JP)

(72) Inventor: Taewon Kim, Tokyo (JP)

(73) Assignees: Kabushiki Kaisha Toshiba, Kawasaki (JP); Toshiba Electronic Devices & Storage Corporation, Kawasaki (JP)

( * ) Notice: Subject to any disclaimer, the term of this patent is extended or adjusted under 35 U.S.C. 154(b) by 498 days.

(21) Appl. No.: 17/939,499

(22) Filed: Sep. 7, 2022

(65) Prior Publication Data

US 2023/0300763 A1    Sep. 21, 2023

(30) Foreign Application Priority Data

Mar. 18, 2022    (JP) ................ 2022-043999

(51) Int. Cl.
  *H04W 56/00*    (2009.01)
  *H04W 72/00*    (2023.01)
  *H04W 72/30*    (2023.01)

(52) U.S. Cl.
  CPC ....... *H04W 56/0015* (2013.01); *H04W 72/30* (2023.01)

(58) Field of Classification Search
  CPC ............. H04L 47/806; H04L 49/201; H04W 56/0015; H04W 72/30
  See application file for complete search history.

(56) References Cited

U.S. PATENT DOCUMENTS

| | | | |
|---|---|---|---|
| 8,496,181 B2* | 7/2013 | Wang | H04W 76/14 |
| | | | 235/462.46 |
| 2019/0132929 A1 | 5/2019 | Sturm et al. | |
| 2020/0034354 A1 | 1/2020 | Horita et al. | |
| 2021/0037350 A1* | 2/2021 | Wang | H04W 48/16 |
| 2021/0212104 A1* | 7/2021 | Li | H04W 72/23 |

(Continued)

FOREIGN PATENT DOCUMENTS

| | | |
|---|---|---|
| JP | H04-095429 A | 3/1992 |
| JP | 2008-103996 A | 5/2008 |
| JP | 2012039556 A | 2/2012 |

(Continued)

OTHER PUBLICATIONS

Notice of Reasons for Refusal (Office Action) mailed Mar. 11, 2025 in corresponding Japanese Patent Application No. 2022-043999 with English machine translation, 11 pages.

*Primary Examiner* — Alpus Hsu
(74) *Attorney, Agent, or Firm* — Kim & Stewart LLP

(57) ABSTRACT

According to one embodiment, a communication system comprises a transmitter device and receiver devices. The transmitter device transmits data and identification information. The identification information comprises first information indicative of a communication mode and second information indicative of a receiver device of a transmission destination data. Each of the receiver devices determines whether the receiver device receives the data based on at least a part of the second information.

11 Claims, 8 Drawing Sheets

(56) References Cited

U.S. PATENT DOCUMENTS

2021/0227523 A1\* 7/2021 Zhang .................. H04W 72/20

FOREIGN PATENT DOCUMENTS

| JP | 2017063390 A | 3/2017 |
|----|--------------|--------|
| JP | 2018073601 A | 5/2018 |
| JP | 2019088000 A | 6/2019 |
| JP | 6652477 B2 | 2/2020 |
| JP | 2021009765 A | 1/2021 |
| JP | 2021-040171 A | 3/2021 |
| JP | 2021-105292 A | 7/2021 |
| WO | 2009/121406 A1 | 10/2009 |

\* cited by examiner

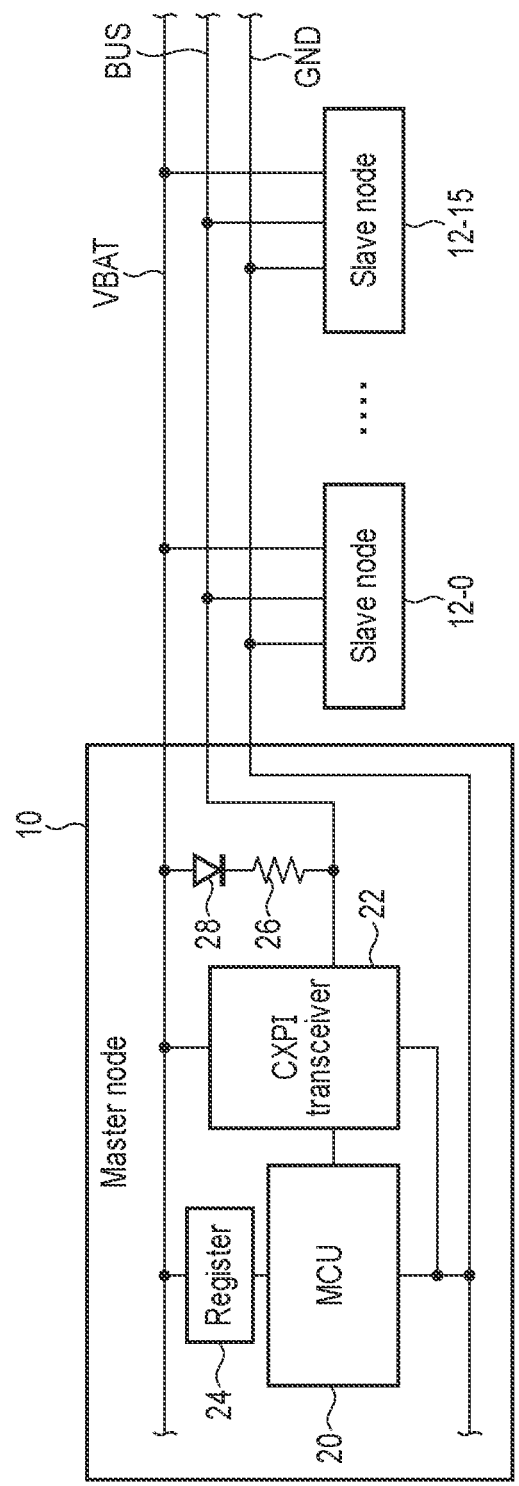
F I G. 1

|  | Bit 0 | Bit 1 | Bit 2 | Bit 3 | Bit 4 | Bit 5 | Bit 6 | Bit 7 |
|---|---|---|---|---|---|---|---|---|
| NAD | * | * | * | * | * | * | * | * |
| PCI(08h) | 0 | 0 | 0 | 1 | 0 | 0 | 0 | 0 |
| SID(2Eh) | 0 | 1 | 1 | 1 | 0 | 1 | 0 | 0 |
| DID1(FFh) | 1 | 1 | 1 | 1 | 1 | 1 | 1 | 1 |
| DID2(02h) | 0 | 1 | 0 | 0 | 0 | 0 | 0 | 0 |
| Start index(00h) | 0 | 0 | 0 | 0 | 0 | 0 | 0 | 0 |
| PID1 | 0 | 0 | 0 | * | * | * | * | Parity |
| PID2(FFh) | 1 | 1 | 1 | 1 | 1 | 1 | 1 | 1 |
| PID3(FFh) | 1 | 1 | 1 | 1 | 1 | 1 | 1 | 1 |
| PID4(FFh) | 1 | 1 | 1 | 1 | 1 | 1 | 1 | 1 |

FIG. 2

| No. | Bit 0 | Bit 1 | Bit 2 | PID transmitting node | Reply transmitting node | Communication mode | Details |
|---|---|---|---|---|---|---|---|
| 1 | 0 | 0 | 0 | Master node | Master node | Data transmission to a slave node | Slave node with bits 3-6 of PID receives reply |
| 2 | 0 | 0 | 1 | Master node | Master node | Data transmission to two slave nodes | Two slave nodes with bits 4-6 of PID receive reply |
| 3 | 0 | 1 | 0 | Master node | Master node | Data transmission to four slave nodes | Four slave nodes with bits 5-6 of PID receive reply |
| 4 | 0 | 1 | 1 | Master node | Master node | Data transmission to eight slave nodes | Eight slave nodes with bit 6 of PID receive reply |
| 5 | 1 | 0 | 0 | Slave node | Slave node | Data reception from slave node | Master node receives reply from slave node with bits 3-6 of PID |
| 6 | 1 | 0 | 1 | Master node | Slave node | Data request from slave node | Master node receives reply from slave node with bits 3-6 of PID |
| 7 | 1 | 1 | 0 | Slave node | Master node | Data reply to slave node | Master node transmits reply to slave node with bits 3-6 of PID |
| 8 | 1 | 1 | 1 | — | — | Unused | May overlap reserved frame |

F I G. 4

| PID | | | | | | | |
|---|---|---|---|---|---|---|---|
| Bit 0 | Bit 1 | Bit 2 | Bit 3 | Bit 4 | Bit 5 | Bit 6 | Bit 7 |
| 0 | 0 | 0 | 0 | 0 | 0 | 0 | P |
FIG. 5A
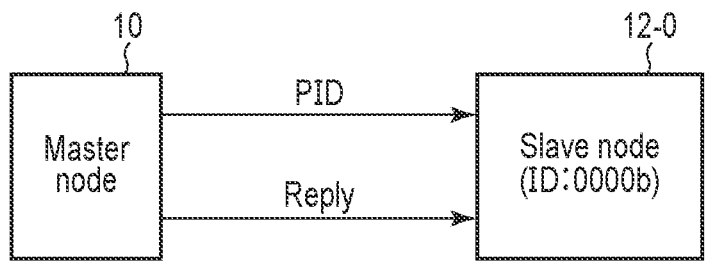
FIG. 5B
| PID | | | | | | | |
|---|---|---|---|---|---|---|---|
| Bit 0 | Bit 1 | Bit 2 | Bit 3 | Bit 4 | Bit 5 | Bit 6 | Bit 7 |
| 0 | 0 | 1 | * | 0 | 0 | 0 | P |
FIG. 6A
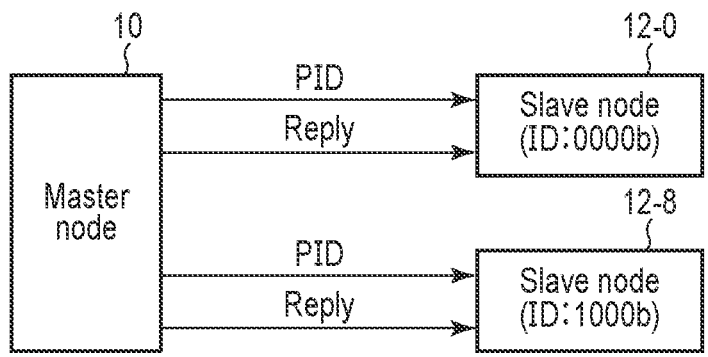
FIG. 6B

| PID | | | | | | | |
|---|---|---|---|---|---|---|---|
| Bit 0 | Bit 1 | Bit 2 | Bit 3 | Bit 4 | Bit 5 | Bit 6 | Bit 7 |
| 0 | 1 | 0 | * | * | 0 | 0 | P |

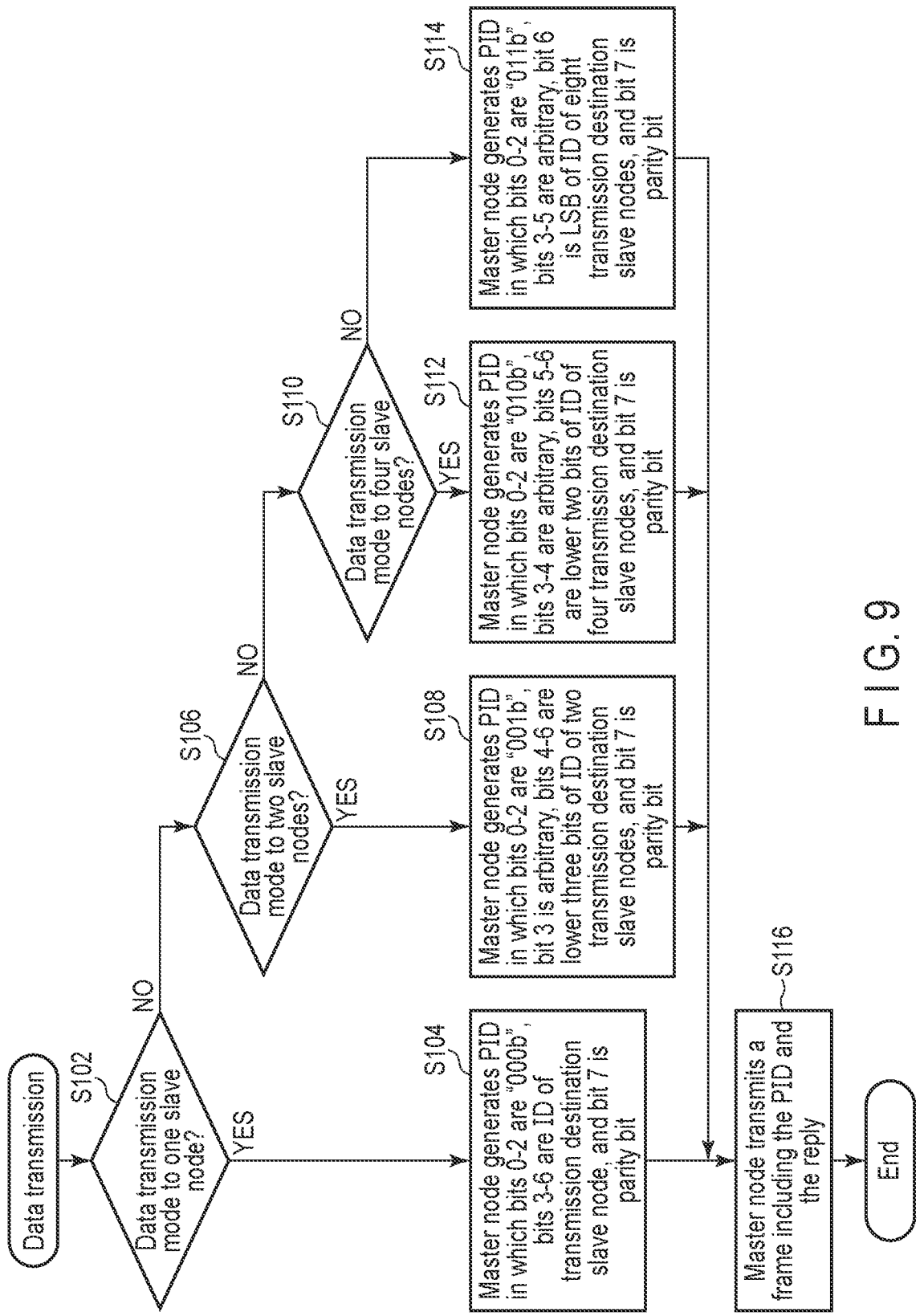
F I G. 9

_US 12,445,984 B2_

COMMUNICATION SYSTEM, TRANSMITTER DEVICE, AND RECEIVER DEVICE

CROSS-REFERENCE TO RELATED APPLICATIONS

This application is based upon and claims the benefit of priority from Japanese Patent Application No. 2022-043999, filed Mar. 18, 2022, the entire contents of which are incorporated herein by reference.

FIELD

Embodiment described herein relate generally to large-capacity data communication.

BACKGROUND

Society of Automotive Engineers of Japan, Inc., has defined an automotive communication protocol standard referred to as Clock Extension Peripheral Interface (CXPI). CXPI aims to reduce the number of wiring harnesses and multiplexed communications between automotive devices subjected to one-to-one connection, which have increased in the human machine interface (HMI) domain. In CXPI, bidirectional communication between a master node and slave nodes has been defined.

The master node outputs a frame to the bus. The frame includes a reply and a PID indicating the slave node which is a transmission destination of data. The slave node determines whether the frame is a frame for the own node, based on the PID, and receives a reply for the own node. The slave node does not receive the reply when determining that the frame is not for the own node. As a result, one-to-one communication between the master node and each of the slave nodes is executed.

In the current CXPI, broadcast is not defined.

For this reason, when the master node is to transmit the same data to the slave nodes, one-to-one communication is repeated for the number of slave nodes, resulting in a gap in the timing of transmitting the data by the slave nodes.

BRIEF DESCRIPTION OF THE DRAWINGS

FIG. 1 is a block diagram showing an example of a CXPI communication system according to the embodiment.

FIG. 2 shows an example of the PID setting frame according to the embodiment.

FIG. 4 is a table illustrating an example of identification information of communication mode according to the embodiment.

FIG. 5A is a table showing an example of a PID transmitted in the one-to-one single cast according to the embodiment.

FIG. 5B is a view showing a situation of the example of the one-to-one single cast according to the embodiment.

FIG. 6A is a table showing an example of a PID transmitted in the one-to-two broadcast according to the embodiment.

FIG. 6B is a view showing a situation of an example of the one-to-two broadcast according to the embodiment.

FIG. 9 is a flowchart showing an example of a frame transmission during a data transmission mode according to the embodiment.

DETAILED DESCRIPTION

Figure 3A:
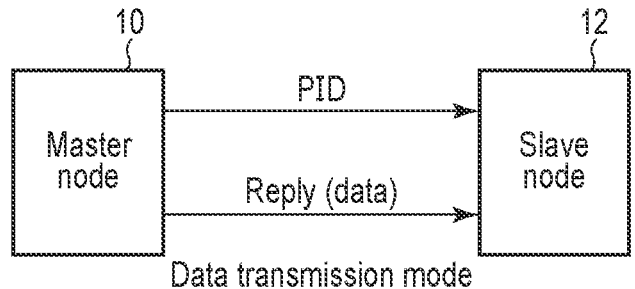
FIG. 3A is a view illustrating an example of communication modes according to the embodiment.

Various embodiments will be described hereinafter with reference to the accompanying drawings.

The disclosure is merely an example and is not limited by contents described in the embodiments described below. Modification which is easily conceivable by a person of ordinary skill in the art comes within the scope of the disclosure as a matter of course. In order to make the description clearer, the sizes, shapes, and the like of the respective parts may be changed and illustrated schematically in the drawings as compared with those in an accurate representation. Constituent elements corresponding to each other in a plurality of drawings are denoted by like reference numerals and their detailed descriptions may be omitted unless necessary.

In general, according to one embodiment, a communication system comprises a transmitter device and receiver devices. The transmitter device is configured to transmit data and identification information to the receiver devices. The identification information comprises first information indicative of a communication mode and second information indicative of a receiver device of a transmission destination data. Each of the receiver devices is configured to determine whether the receiver device receives the data based on at least a part of the second information when the first information is indicative of data transmission mode from the transmitter device.

FIG. 1 is a block diagram showing an example of a CXPI communication system according to the embodiment. The CXPI communication system includes slave nodes 12-0 to 12-15 (hereinafter referred to as the slave node 12 unless individually identified) each connectible to a plurality of devices, and a master node 10 that controls the slave nodes 12. The number of slave nodes 12 that are connected to one master node 10 is arbitrarily set. For example, eight or sixteen slave nodes 12 may be connected to one master node 10. FIG. 1 shows an example in which sixteen slave nodes 12 are connected to the master node 10. Each of the nodes and 12 has a node address. In the communication system on automobiles, examples of devices connected to the slave nodes 12 are steering switches, wiper switches, light switches, blinker switches, motors, lights, and the like.

The master node 10 can also be connected to a plurality of devices. The master node 10 is also referred to as a body control module (BCM). The master node 10 and the slave nodes 12 are connected via a power line VBAT, a signal line BUS, and a ground line GND. A plurality of devices connected to the slave nodes 12 communicate with the master node 10 via the signal line BUS. The master node 10 includes a microcontroller unit (MCU) 20, a CXPI transceiver 22, and a register 24.

The MCU 20 controls the entire master node 10.

The CXPI transceiver 22 modulates data from the MCU 20 and outputs the modulated data to the signal line BUS. An example of the modulation method is pulse width modulation (PWM). The CXPI transceiver 22 demodulates the data from the signal line BUS and outputs the demodulated data to the MCU 20.

The MCU 20 stores the data in the register 24. The register 24 is, for example, a nonvolatile memory. The signal line BUS and the power line VBAT are connected to each other in the master node 10 via a resistor 26 and a diode 28 in series.

The signal on the signal line BUS is set to a low level or a high level. Each bit of the signal represents "0" or "1" according to the ratio of a low level period to a high level period.

In the CXPI communication, an event-trigger frame is communicated. Each node can freely transmit a frame when detecting an idle status of the signal line BUS. When a plurality of transmission events occur simultaneously, an event for the frame with higher priority is selected by arbitration.

In the CXPI communication, the communication frame communicated on the signal line BUS includes a protected ID (PID) and a reply.

The PID includes a parity bit and a frame ID. When the communication mode is data transmission, the frame ID is an identifier of the slave node which receives the frame. The priority is set for the frame in advance, and arbitration is performed based on the priority.

The master node 10 sets the PID for each slave node 12 and transmits the PID of the slave node 12 to the slave node 12. When the communication mode is data transmission, the slave node 12 receives the PID and determines whether the received PID matches its own PID. If the received PID matches its own PID, the slave node 12 receives a reply.

The reply includes, for example, frame information (1-2 bytes), data (0-255 (max) bytes), and CRC (1-2 bytes).

In order for the master node 10 and the slave node 12 to communicate, the PID needs to be set in the slave node 12. When detecting the connection with the slave node 12, the master node 10 sets the PID of the slave node 12 and transmits the frame for setting the PID to the slave node 12.

FIG. 2 shows an example of the PID setting frame according to the embodiment. The master node 10 transmits the PID frame to the slave node 12 at the PID setting. In FIG. 2, "*" indicates any bit of "0" or "1".

The PID setting frame includes NAD, PCI, SID, DID1, DID2, Start Index, PID1, PID2, PID3, and PID4, each of which is 8-bit data. NAD is a node address of the slave node 12 in which the PID is set. PCI is, for example, 08h. SID is, for example, 2Eh. DID1 is, for example, FFh. DID2 is, for example, 02h. Start Index is, for example, 00h. Bits 0-2 of PID1 are, for example, "0". Bits 3-4 of PID1 are, for example, any bit of "0" or "1". Bit 7 of PID1 is, for example, a parity bit. PID2, PID3, and PID4 are, for example, FFh.

In the PID setting frame in FIG. 2, the same format as the format of the PID setting frame in the current CXPI communication is used. The current CXPI communication includes a plurality of communication modes and, in the PID setting frame, a plurality of PIDs can be set in each of the plurality of communication modes. FIG. 2 shows an example of the frame in which up to four PIDs, i.e., PID1 to PID4 can be set. Start Index is information that designates the PID to be set. Start Index is 00h when PID1 is set (example in FIG. 2), 01h when PID2 is set, 03h when PID3 is set, and 04h when PID4 is set. For example, when PID1 to PID4 are set, the master node 10 sets "0" to bits 0-3 of Start Index.

The CXPI communication according to the embodiment includes a plurality of communication modes, and the master node 10 sets one PID1 for the slave node 12 irrespective of the communication modes. The master node 10 sets "0" to all bits of Start Index. In the embodiment, since the number of slave nodes 12 is sixteen, 4 bits are sufficient for the identification information of the slave nodes 12. Since PID1 is 8 bits, the master node 10 sets the identification information (4 bits) of the slave nodes 12 in 4 bits (for example, bits 3-6) of PID1. The master node 10 sets 0b or 1b to the remaining three bits (for example, bits 0-2) of PID1. The master node 10 sets FFh to PID2 to PID4. In addition, bits 0-2 of PID1 and all bits of PD2 to PID4 are not used for the PID setting.

The master node 10 outputs the PID setting frame set as shown in FIG. 2 to the signal line BUS. All the slave nodes 12 connected to the signal line BUS receive the PID setting frame. The only slave node 12 having the node address designated by the node address NAD takes in PID1 and writes bits 3-6 of PID1 to an internal register (not shown) as its own identification information. The PID is thereby set to the slave node 12. The PID is not set in the slave node 12 whose node address designated by the node address NAD does not match its own node address.

FIG. 3A to FIG. 3D are views illustrating examples of communication modes of the CXPI communication according to the embodiment. The communication modes are roughly classified into four modes, i.e., a data transmission mode, a data reception mode, a data request mode, and a data reply mode.

FIG. 3A shows an example of the data transmission mode. In the data transmission mode, the master node transmits data to the slave node 12. The master node 10 transmits a PID and a reply to the slave node 12. The PID includes the identification information of the communication mode (data transmission mode) and the identification information of the slave node 12 which receives the data. The master node 10 sets the identification information of the communication mode to bits 0-2 of the PID, sets the identification information of the slave node 12 to bits 3-6 of the PID, and sets the parity bit to bit 7 of the PID.

All the slave nodes 12 connected to the signal line BUS receive the frame. At least one slave node 12 identified based on the identification information included in the PID in the frame receives the reply (data) and writes the received data to the internal register. The slave nodes 12 other than the at least one slave node 12 does not receive the reply (data). Identifying the slave node 12 based on the identification information included in the PID will be described below with reference to FIG. 5A to FIG. 8B.

Figure 3B:
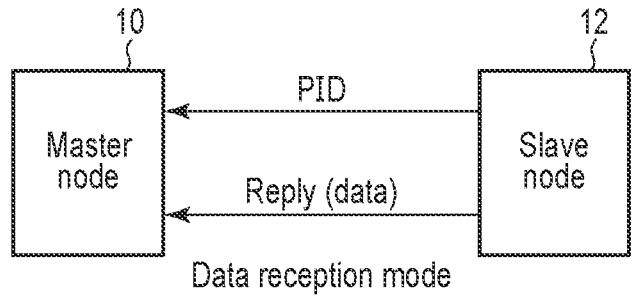
FIG. 3B is a view illustrating another example of communication modes according to the embodiment.

FIG. 3B shows an example of the data reception mode. In the data reception mode, the master node 10 receives a reply (data) from the slave node 12. The slave node 12 outputs a frame to the signal line BUS. The frame includes a PID and a reply (data). The PID includes the identification information of the communication mode (data reception mode) and its own identification information. The slave node 12 sets the identification information of the communication mode to bits 0-2 of the PID, sets the own identification information to bits 3-6 of the PID, and sets the parity bit to bit 7 of the PID.

The master node 10 identifies the slave node 12, based on the identification information of the slave node included in bits 3-6 of the PID in the received frame, and receives the reply (data) included in the frame as data from the identified slave node 12.

Figure 3C:
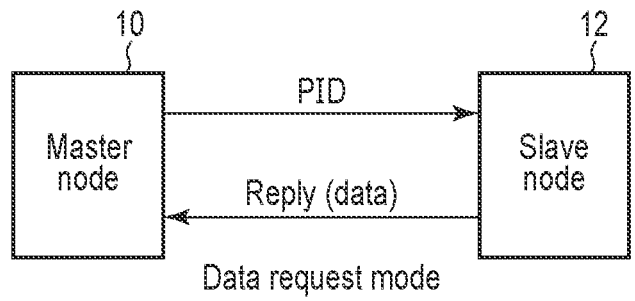
FIG. 3C is a view illustrating another example of communication modes according to the embodiment.

FIG. 3C shows an example of a data request mode. In the data request mode, the master node 10 requests the slave node 12 to transmit a reply (data). The master node 10 outputs a PID to the signal line BUS. The PID includes the identification information of the communication mode (data request mode) and the identification information of the slave node 12 that is requested to transmit the reply (data). The master node 10 sets the identification information of the communication mode to bits 0-2 of the PID, sets the identification information of the slave node 12 to bits 3-6 of the PID, and sets the parity bit to bit 7 of the PID.

All the slave nodes 12 connected to the signal line BUS receive the PID. The slave node 12 whose own identification information matches the identification information of the slave node included in the received PID transmits the reply (data), based on the identification information of the communication mode included in the PID.

The master node 10 receives the received reply (data) as data from the slave node 12 that is requested to transmit the reply.

Figure 3D:
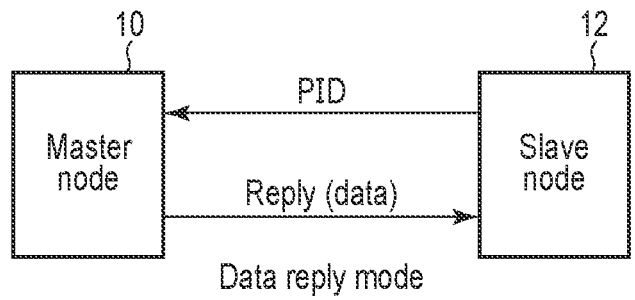
FIG. 3D is a view illustrating another example of communication modes according to the embodiment.

FIG. 3D shows an example of the data reply mode. In the data reply mode, the master node 10 transmits a reply (data) to the slave node 12. The slave node 12 outputs a PID to the signal line BUS. The PID includes the identification information of the communication mode (data reply mode) and its own identification information The slave node 12 sets the identification information of the communication mode to bits 0-2 of the PID, sets the own identification information to bits 3-6 of the PID, and sets the parity bit to bit 7 of the PID.

The master node 10 outputs the reply (data) to the received PID to the signal line BUS. The slave node 12 receives the reply (data) from the master node 10 as a reply to the PID, and writes the received data to an internal register.

FIG. 4 is a table illustrating an example of the identification information of the communication mode set to bits 0-2 of the PID, according to the embodiment. In the embodiment, one-to-many broadcast can be executed in addition to one-to-one single cast. The data transmission mode is classified into one-to-one single cast, one-to-two broadcast, one-to-four broadcast, and one-to-eight broadcast.

The communication mode of identification number 1 relates to a data transmission mode by one-to-one single cast (FIG. 3A). FIG. 5A and FIG. 5B illustrating an example of the one-to-one single cast according to the embodiment. FIG. 5A is a table showing an example of a PID transmitted in the one-to-one single cast. FIG. 5B is a view showing a situation of the example of the one-to-one single cast. The master node 10 transmits the PID and the reply (data).

"000b" is set to bits 0-2 of the PID. Identification information "0000b" of the slave node 12 (in this case, slave node 12-0) receiving the reply is set to bits 3-6. Bit 7 of the PID is the parity bit.

When bits 0-2 of the PID are "000b", all the slave nodes 12 that have received the PID determine whether bits 3-6 of the PID match their own identification information. Among sixteen slave nodes 12, the only slave node 12-0 has identification information that matches bits 3-6 of the PID. For this reason, when bits 0-2 of the PID are "000b", only one slave node 12-0 whose own identification information matches bits 3-6 of the PID receives the reply. The data transmission mode using one-to-one single cast is thereby realized.

The communication mode of identification number 2 relates to a data transmission mode using one-to-two broadcast (FIG. 3A). FIG. 6A and FIG. 6B are views illustrating an example of one-to-two broadcast according to the embodiment. FIG. 6A is a table showing an example of a PID transmitted in the one-to-two broadcast. FIG. 6B is a view showing a situation of an example of the one-to-two broadcast. The master node 10 transmits the PID and the reply (data).

"001b" is set to bits 0-2 of the PID. Either "0" or "1" is arbitrarily set to bit 3 of the PID. Information "000b" of lower-order three bits of the identification information of two slave nodes receiving the reply is set to bits 4-6 of the PID. The information "000b" equals to bits 0-2 of identification information "0000b" of the slave node 12-0 and bits 0-2 of identification information "1000b" of the slave node 12-8. Bit 7 of the PID is the parity bit.

When bits 0-2 of the PID are "001b", all the slave nodes 12 that have received the PID ignore bit 3 of the PID and determine whether bits 4-6 of the PID match lower-order three bits (bits 0-2) of their own identification information. Among sixteen slave nodes 12, slave nodes 12-0 and 12-8 have lower-order three bits of the identification information that match bits 4-6 of the PID. For this reason, when bits 0-2 of the PID are "001b", two slave nodes 12-0 and 12-8 whose lower-order three bits of the identification information match bits 4-6 of the PID receive the reply. The data transmission mode using the one-to-two broadcast is thereby realized.

Figures 7A, 7B:
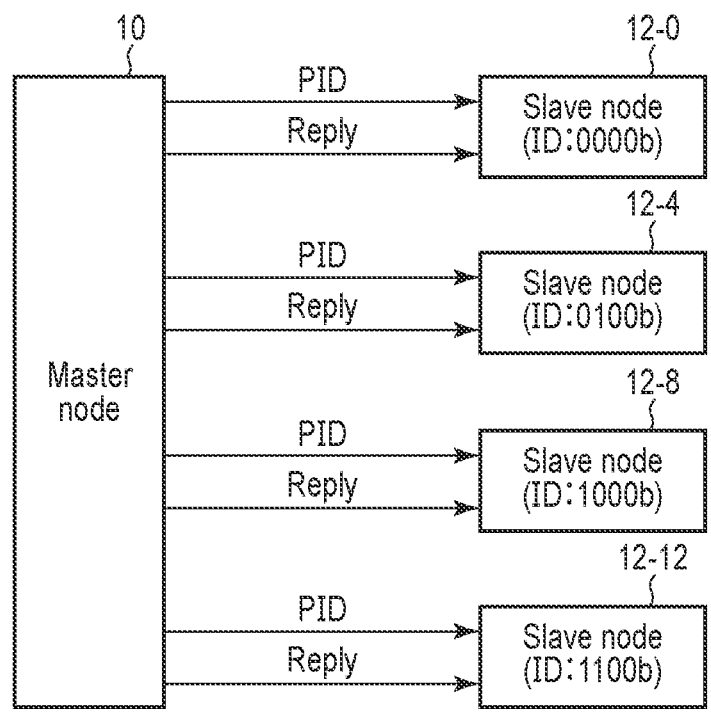
FIG. 7A is a table showing an example of a PID transmitted in the one-to-four broadcast according to the embodiment.
FIG. 7B is a view showing a situation of an example of the one-to-four broadcast according to the embodiment.

The communication mode of identification number 3 relates to a data transmission mode using one-to-four broadcast (FIG. 3A). FIG. 7A and FIG. 7B are views illustrating an example of the one-to-four broadcast according to the embodiment. FIG. 7A is a table showing an example of a PID transmitted in the one-to-four broadcast. FIG. 7B is a view showing a situation of an example of the one-to-four broadcast. The master node 10 transmits the PID and the reply (data).

"010b" is set to bits 0-2 of the PID. Either "0" or "1" is arbitrarily set to bits 3-4 of the PID. Information "00b" of lower-order two bits of the identification information of four slave nodes receiving the reply is set to bits 5-6 of the PID. The information "00b" equals to bits 0-1 of identification information "0000b" of the slave node 12-0, bits 0-1 of identification information "0100b" of the slave node 12-4, bits 0-1 of identification information "1000b" of the slave node 12-8, and bits 0-1 of identification information "1100b" of the slave node 12-12. Bit 7 of the PID is the parity bit.

When bits 0-2 of the PID are "010b", all the slave nodes 12 that have received the PID ignore bits 3-4 of the PID and determine whether bits 5-6 of the PID match lower-order two bits (bits 0-1) of their own identification information. Among sixteen slave nodes 12, slave nodes 12-0, 12-4, 12-8, and 12-12 have lower-order two bits of the identification information that match bits 5-6 of the PID. For this reason, when bits 0-2 of the PID are "010b", four slave nodes 12-0, 12-4, 12-8, and 12-12 whose lower-order two bits of the identification information match bits 5-6 of the PID receive the reply. The data transmission mode using the one-to-four broadcast is thereby realized.

Figures 8A, 8B:
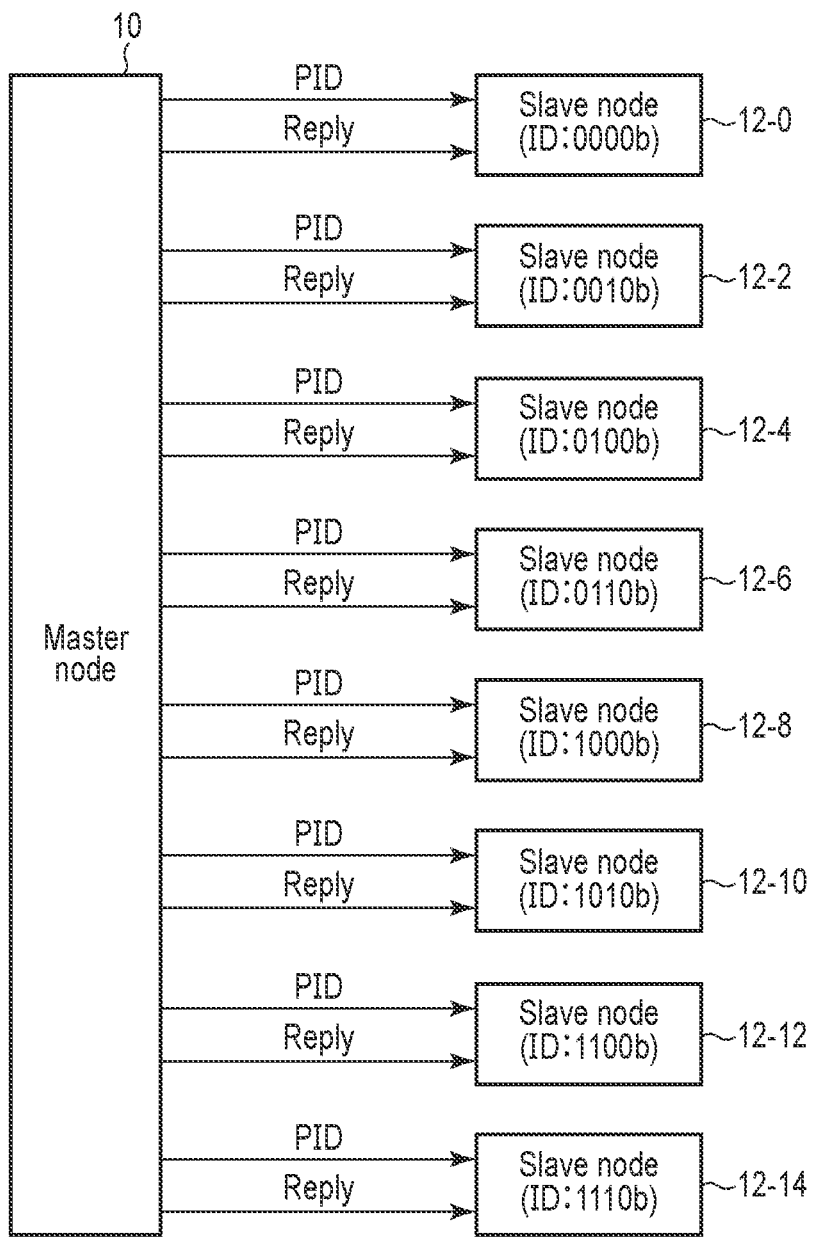
FIG. 8A is a table showing an example of a PID transmitted in the one-to-eight broadcast according to the embodiment.
FIG. 8B is a view showing a situation of an example of the one-to-eight broadcast according to the embodiment.

The communication mode of identification number 4 relates to a data transmission mode using one-to-eight broadcast (FIG. 3A). FIG. 8A and FIG. 8B are views illustrating an example of the one-to-eight broadcast according to the embodiment. FIG. 8A is a table showing an example of a PID transmitted in the one-to-eight broadcast. FIG. 8B is a view showing a situation of an example of the one-to-eight broadcast. The master node 10 transmits the PID and the reply (data).

"011b" is set to bits 0-2 of the PID. Either "0" or "1" is arbitrarily set to bits 3-5 of the PID. Information "0" of LSB of the identification information of eight slave nodes receiving the reply is set to bit 6 of the PID. The information "0" equals to LSB of identification information "0000b" of the slave node 12-0, LSB of identification information "0010b" of the slave node 12-2, LSB of identification information "0100b" of the slave node 12-4, LSB of identification information "0110b" of the slave node 12-6, LSB of identification information "1000b" of the slave node 12-8, LSB of identification information "1010b" of the slave node 12-10, LSB of identification information "1100b" of the slave node 12-12, and LSB of identification information "1110b" of the slave node 12-14. Bit 7 of the PID is the parity bit.

When bits 0-2 of the PID are "011b", all the slave nodes 12 that have received the PID ignore bits 3-5 of the PID and determine whether bit 6 of the PID matches the LSB of their own identification information. Among sixteen slave nodes 12, slave nodes 12-0, 12-2, 12-4, 12-6, 12-8, 12-12, and 12-14 have LSB of the identification information that match bit 6 of the PID. For this reason, when bits 0-2 of the PID are "011b", eight slave nodes, i.e., the slave nodes 12-0, 12-2, 12-4, 12-6, 12-8, 12-10, 12-12, and 12-14 whose LSB of their own identification information match bit 6 of the PID receive the reply. The data transmission mode using the one-to-eight broadcast is thereby realized.

The communication mode of identification number 5 relates to a data transmission mode (FIG. 3B). The slave node 12 transmits the PID and the reply.

"100b" is set to bits 0-2 of the PID, and the identification information of the slave node that transmits the PID and the reply is set to bits 3-6 of the PID.

When bits 0-2 of the PID are "100b", the master node 10 that has received the PID receives the reply received next to the PID as data from the slave node 12 indicated by bits 3-6 of the PID. The data reception mode is a one-to-one communication.

The communication mode of identification number 6 relates to data request mode (FIG. 3C). The master node 10 transmits the PID and the slave node 12 transmits the reply (data request).

"101b" is set to bits 0-2 of the PID, and the identification information of the slave node that transmits the reply is set to bits 3-6 of the PID.

When bits 0-2 of the PID are "101b", the slave node 12 that has received the PID outputs the reply to the signal line BUS if the identification information set in itself matches bits 3-6 of the PID. The data request mode is also the one-to-one communication.

The communication mode of identification number 7 relates to a data reply mode (FIG. 3D). The slave node 12 transmits the PID and the master node 10 transmits the reply.

"110b" is set to bits 0-2 of the PID, and the identification information of the slave node that transmits the reply is set to bits 3-6 of the PID.

When bits 0-2 of the PID are "110b", the master node 10 that has received the PID outputs the reply to the signal line BUS if the identification information set in itself matches bits 3-6 of the PID. The slave node 12 receives the reply received when transmitting the PID. The data reply mode is also the one-to-one communication.

FIG. 9 is a flowchart showing an example of the frame transmission during the data transmission mode executed by the master node 10, according to the embodiment.

The master node 10 determines whether the data transmission mode to be executed is the data transmission mode to one slave node 12 (S102).

If the data transmission mode to be executed is the data transmission mode to one slave node 12 (YES in S102), the master node 10 generates the PID in which bits 0-2 are "000b", bits 3-6 are the identification information (ID) of the slave node 12 serving as the transmission destination, and bit 7 is the parity bit (S104). For example, as shown in FIGS. 5A and 5B, when the slave node serving as the transmission destination is the slave node 12-0, bits 3-6 of the PID are "0000b".

If the data transmission mode to be executed is not the data transmission mode to one slave node 12 (NO in S102), the master node 10 determines whether the data transmission mode to be executed is the data transmission mode to two slave nodes (S106).

If the data transmission mode to be executed is the data transmission mode to two slave nodes 12 (YES in S106), the master node 10 generates the PID in which bits 0-2 are "001b", bit 3 is any bit of "0" or "1", bits 4-6 are lower-order three bits (common in two slave nodes) of the identification information of two slave nodes 12, and bit 7 is the parity bit (S108). For example, as shown in FIGS. 6A and 6B, if the two slave nodes are the slave nodes 12-0 and 12-8, bits 4-6 of the PID are "000b".

If the data transmission mode to be executed is not the data transmission mode to two slave nodes 12 (NO in S106), the master node 10 determines whether the data transmission mode to be executed is the data transmission mode to four slave nodes (S110).

If the data transmission mode to be executed is the data transmission mode to four slave nodes 12 (YES in S110), the master node 10 generates the PID in which bits 0-2 are "010b", bits 3-4 are any bits of "0" or "1", bits 5-6 are lower-order two bits (common in four slave nodes) of the identification information of four slave nodes 12, and bit 7 is the parity bit (S112). For example, as shown in FIGS. 7A and 7B, if the four slave nodes are the slave nodes 12-0, 12-4, 12-8, and 12-12, bits 5-6 of the PID are "00b".

If the data transmission mode to be executed is not the data transmission mode to four slave nodes 12 (NO in S110), the master node 10 determines that the data transmission mode to be executed is the data transmission mode to eight slave nodes 12, and generates the PID in which bits 0-2 are "011b", bits 3-5 are any bits of "0" or "1", bit 6 is the LSB (common in eight slave nodes) of the node addresses of eight slave nodes 12, and bit 7 is the parity bit (S114). For example, as shown in FIGS. 8A and 8B, when the eight slave nodes are slave nodes 12-0, 12-2, 12-4, 12-6, 12-8, 12-10, and 12-12, bit 6 of the PID is "0b".

After the PID generation process (S S104, S108, S112, and S114), the master node 10 transmits a frame including the PID and the reply (including the frame information, the data, and the CRC) as shown in FIG. 4 (S116).

According to the embodiment, parts of the PID including 8 bits (bits 3-7) are used as the identification information of the slave node, and the other parts (bits 0-2) are used as the identification information of the communication mode. When the communication mode is the data transmission mode, the slave node receives a reply if its own identification information matches the identification information included in the PID. The communication mode includes the data transmission mode using broadcast as well as the data transmission mode using single cast. When the communication mode is the data transmission mode using broadcast, the identification information of the communication mode can specify the number of slave nodes serving as transmission destinations. When the identification information of the communication mode is indicative of the number of slave nodes serving as the transmission destinations, the slave nodes ignore several bits when comparing the identification information. The broadcast is thereby realized. For this reason, a plurality of devices connected to the slave nodes 12 can transmit the data simultaneously. Automotives, the blinker function may use four lights in the front and rear sides and, if the broadcast is not executed, the timing of turning on these lights is shifted.

Furthermore, according to the embodiment, the master node 10 does not set the PID for each communication mode, but sets one PID to which the identification information of the communication mode is added. The slave node 12 discriminates the identification information of the communication mode in one PID received and executes processes according to the discrimination result. For this reason, even if a large number of communication modes are used, the PID is set only once, and the communication time for PID setting can be saved.

While certain embodiments have been described, these embodiments have been presented by way of example only, and are not intended to limit the scope of the inventions. Indeed, the novel embodiments described herein may be embodied in a variety of other forms; furthermore, various omissions, substitutions, and changes in the form of the embodiments described herein may be made without departing from the spirit of the inventions. The accompanying claims and their equivalents are intended to cover such forms or modifications as would fall within the scope and spirit of the inventions.

What is claimed is:

1. A communication system comprising a transmitter device and receiver devices, wherein:
    the transmitter device is configured to transmit data and identification information to the receiver devices, the identification information comprising first information indicative of a communication mode and second information indicative of a receiver device of a transmission destination data;
    each of the receiver devices is configured to determine whether the receiver device receives the data based on at least a part of the second information when the communication mode of the first information is indicative of a data transmission mode from the transmitter device;
    the communication mode of the first information is indicative of a data transmission mode using single cast or a data transmission mode using broadcast;
    when the communication mode of the first information is indicative of the data transmission mode using single cast, each of the receiver devices is configured to determine whether the receiver device receives the data based on all bits of the second information;
    the second information comprises bits of information;
    the transmitter device is configured to set bits of third information to the receiver devices, respectively;
    when the communication mode of the first information is indicative of the data transmission mode using single cast, and when all bits of the second information match all bits of the third information, each of the receiver devices receives the data; and
    when the communication mode of the first information is indicative of the data transmission mode using broadcast, and when several bits of the second information match several bits of the third information, each of the receiver devices receives the data.

2. The communication system of claim 1, wherein:
    when the first information is indicative of a number of receiver devices of broadcast target, a number of the several bits corresponds to the number of the receiver devices of broadcast target; and
    the number of the several bits reduces as the number of the receiver devices of broadcast target increases.

3. A transmitter device communicating with receiver devices, wherein:
    the transmitter device is configured to transmit first identification information, the first identification information comprising first information indicative of a communication mode and second information indicative of the receiver devices;
    the transmitter device is configured to receive second identification information, the second identification information comprising fourth information indicative of a communication mode and fifth information indicative of the receiver devices;
    the fourth information is indicative of a data reception mode or a data reply mode;
    when the communication mode of the fourth information is indicative of the data reception mode, the transmitter device is configured to receive the second identification information and receive first data from a receiver device indicated by the fifth information among the receiver devices; and
    when the communication mode of the fourth information is indicative of the data reply mode, the transmitter device is configured to receive the second identification information and transmit second data relating to a receiver device indicated by the fifth information among the receiver devices.

4. The transmitter device of claim 3, wherein:
    the communication mode of the first information is indicative of a data transmission mode or a data request mode;
    when the communication mode of the first information is indicative of the data transmission mode, the transmitter device is configured to transmit the first identification information and transmit first data; and
    when the communication mode of the first information is indicative of the data request mode, the transmitter device is configured to transmit the first identification information and receive second data from a receiver device indicated by the second information among the receiver devices.

5. The transmitter device of claim 3, wherein:
    the first information is indicative of a data transmission mode using single cast or a data transmission mode using broadcast; and
    when the communication mode of the first information is indicative of the data transmission mode using single cast, several bits of the second information are invalidated in each of the receiver devices.

6. The transmitter device of claim 5, wherein:
    when the first information is further indicative of a number of receiver devices of broadcast target, a number of the several bits of the second information invalidated increases in accordance with increase in the number of the receiver devices of broadcast target, in each of the receiver devices.

7. A receiver device communicating with a transmitter device, wherein:
the receiver device is configured to receive first identification information, the first identification information comprising first information indicative of a communication mode and second information indicative of a receiver device; and
the receiver device is configured to determine whether the receiver device receives first data transmitted after the first identification information, based on at least a part of the second information, when the communication mode of the first information is indicative of a data transmission mode from the transmitter device;
the second information comprises bits of information;
bits of third information are set by the transmitter device;
when the communication mode of the first information is indicative of the data transmission mode using single cast, and when all bits of the second information match all bits of the third information, the receiver device is configured to receive the first data; and
when the communication mode of the first information is indicative of the data transmission mode using broadcast, and when several bits of the second information match several bits of the third information, the receiver device is configured to receive the first data.

8. The receiver device of claim 7, wherein:
when the communication mode of the first information is indicative of the data transmission mode using single cast, the receiver device is configured to determine whether the receiver device receives the first data, based on all bits of the second information.

9. The receiver device of claim 7, wherein:
when the communication mode of the first information is indicative of the data transmission mode using broadcast and a number of receiver devices of broadcast target, a number of the several bits corresponds to the number of the receiver devices of broadcast target, and the number of the several bits reduces as the number of the receiver devices of broadcast target increases.

10. The receiver device of claim 7, wherein:
when the communication mode of the first information is indicative of a data request mode, and when all bits of the second information match all bits of the third information, after receiving the first identification information, the receiver device is configured to transmit second data.

11. The receiver device of claim 7, wherein:
the receiver device is configured to transmit second identification information comprising fourth information indicative of a data reception mode or a data reply mode;
when the communication mode of the fourth information is indicative of the data reception mode, the receiver device is configured to transmit the second identification information and transmit second data; and
when the communication mode of the fourth information is indicative of the data reply mode, the receiver device is configured to transmit the second identification information and receive second data.

* * * * *